(No Model.)

C. O. DAVIDSON.
TIRE TIGHTENER.

No. 413,495. Patented Oct. 22, 1889.

Witnesses:
E. C. Wurdeman,
R. W. Bishop.

Inventor:
Chas. O. Davidson,
By his attorneys,

UNITED STATES PATENT OFFICE.

CHARLES O. DAVIDSON, OF CARRINGTON, MISSOURI.

TIRE-TIGHTENER.

SPECIFICATION forming part of Letters Patent No. 413,495, dated October 22, 1889.

Application filed May 14, 1889. Serial No. 310,779. (No model.)

*To all whom it may concern:*

Be it known that I, CHARLES OLIVER DAVIDSON, a citizen of the United States, residing at Carrington, in the county of Callaway and State of Missouri, have invented a new and useful Tire-Tightener, of which the following is a specification.

My invention relates to improvements in devices for tightening tires; and it consists in certain novel features hereinafter described and claimed.

Figure 1:
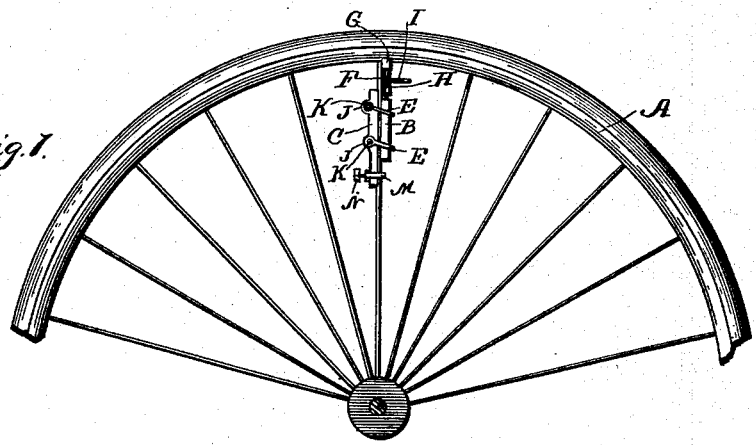
Figure 2:
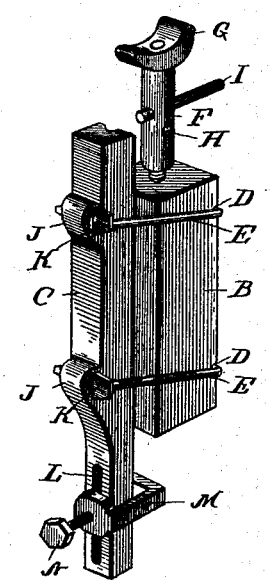
Figure 3:
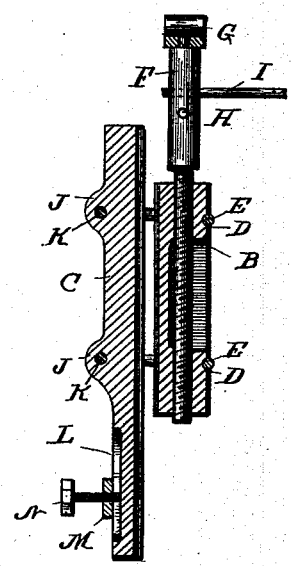

In the drawings, Figure 1 is a side view of a portion of a wheel, showing my improved device applied thereto. Fig. 2 is a perspective view of the device removed from the wheel. Fig. 3 is a longitudinal section of the device.

The wheel A shown in the drawings is of the usual construction and forms no part of my invention.

My improved device for tightening the tire consists of the two members B C, which are adapted to clamp the spoke of the wheel and have their inner opposing faces made slightly concave, so that they will bind more closely around the spoke. The member B is provided on its outer face with transverse grooves D D, which are engaged by the shoulders of the U-shaped bails or links E, which are pivoted to the member C and pass around the spoke and the member B. A jack-screw F is mounted in the member B and extends outward therefrom, its free end being provided with a swiveled head G, which bears against the inner edge of the felly, as clearly shown in Fig. 1. Near its free end the jack-screw is provided with a series of diametrical openings H, which are engaged by a removable lever I in the operation of the device. The member C is provided on its outer side with the transverse tubular offsets J, and the bails E are pivoted to the said member by means of pins K, cast through the ends of the bails and the said offsets. The said member C is further provided in its outer side near its inner end with a longitudinal groove L, and it is secured to the spoke by means of a U-shaped clamp M, which embraces the spoke and the said member, and is provided with a set-screw N, which is adapted to engage the said groove L.

The construction and arrangement of the several parts of my device being thus made known, the operation of the same will, it is thought, be readily understood. The device is applied to the spoke in the manner above described and as shown in the drawings, and the jack-screw is then rotated so as to force it against the felly and thereby cause the felly and the spoke to separate. A divided washer is then placed around the spoke and against the felly, so as to prevent the felly slipping back to its former position, and consequently tightening the tire. As the jack-screw is rotated, the tendency will be to force the member B of my device inward, and this inward movement of the said member will cause the bails to swing inward and thereby clamp the two members firmly around the spoke. The continued movement of the jack-screw will then serve to force the spoke inward away from the felly, so that the necessary washers may be placed between the felly and the shoulder at the end of the spoke to tighten the tire.

My improved device is very simple in its construction and can be manufactured at a slight cost. It is efficient in its operation, and when not in use will occupy but very little room.

Having thus described my invention, what I claim, and desire to secure by Letters Patent, is—

1. A device for use in tightening tires, comprising two members adapted to be clamped around a spoke, one of said members being provided with a longitudinal groove, a clamp embracing said member and the spoke and carrying a set-screw adapted to engage the said groove, and a jack-screw mounted in the other member and adapted to bear on the felly, as set forth.

2. A device for use in tightening tires, comprising the members B C, adapted to be clamped around a spoke, the member B being provided on its outer side with the transverse grooves D and the member C having the tubular offsets J, the bails having their shoulders engaging the grooves D, the pins K, inserted through the ends of the bails, and the offsets J, and the jack-screw mounted in the member B and adapted to bear against the felly, as set forth.

3. A tire-tightener comprising two members, one of said members having a longitudinal groove in its outer side at its lower end, a U-shaped clamp, a set-screw mounted in said clamp and engaging the said groove, bails connecting the members, and a jack-screw mounted in one of the members, as set forth.

4. A tire-tightening device comprising two members adapted to be clamped around a spoke, a jack-screw carried by the members to engage the felly, and the clamp embracing the spoke and engaged with the members, and the swinging bails to connect the members together, as set forth.

In testimony that I claim the foregoing as my own I have hereto affixed my signature in presence of two witnesses.

CHARLES O. DAVIDSON.

Witnesses:
T. B. TURNER,
J. J. PARKE.